United States Patent [19]

Rausch

[11] Patent Number: 4,896,694
[45] Date of Patent: Jan. 30, 1990

[54] PRESSURE-LIMITING VALVE

[75] Inventor: Georg Rausch, Lohr/Main, Fed. Rep. of Germany

[73] Assignee: Mannesmann Rexroth GmbH, Lohr/Main, Fed. Rep. of Germany

[21] Appl. No.: 324,565

[22] Filed: Mar. 16, 1989

[30] Foreign Application Priority Data

Mar. 17, 1988 [DE] Fed. Rep. of Germany ....... 3808962

[51] Int. Cl.$^4$ ........................................... F16K 31/122
[52] U.S. Cl. .................................. 137/491; 137/492.5; 251/120
[58] Field of Search ............... 137/491, 489, 488, 492, 137/492.5; 251/120, 122, 123, 25, 33

[56] References Cited

U.S. PATENT DOCUMENTS

| 2,882,922 | 4/1959 | Schindel | 137/491 |
| 3,771,554 | 11/1973 | Hassall | 137/491 |
| 4,548,231 | 10/1985 | Schwede | 137/491 |
| 4,549,718 | 10/1985 | Seger | 251/123 |

Primary Examiner—Alan Cohan
Attorney, Agent, or Firm—Harness, Dickey & Pierce

[57] ABSTRACT

To reduce the noise on response of a pressure-limiting valve, downstream of the valve seat an annular space, an annular gap and a further annular space are provided. This flow-off system gives a reduction of the noise level. Moreover, in pressureless circulation the flow resistance of the valve is low because the annular gap is freed by the piston.

7 Claims, 1 Drawing Sheet

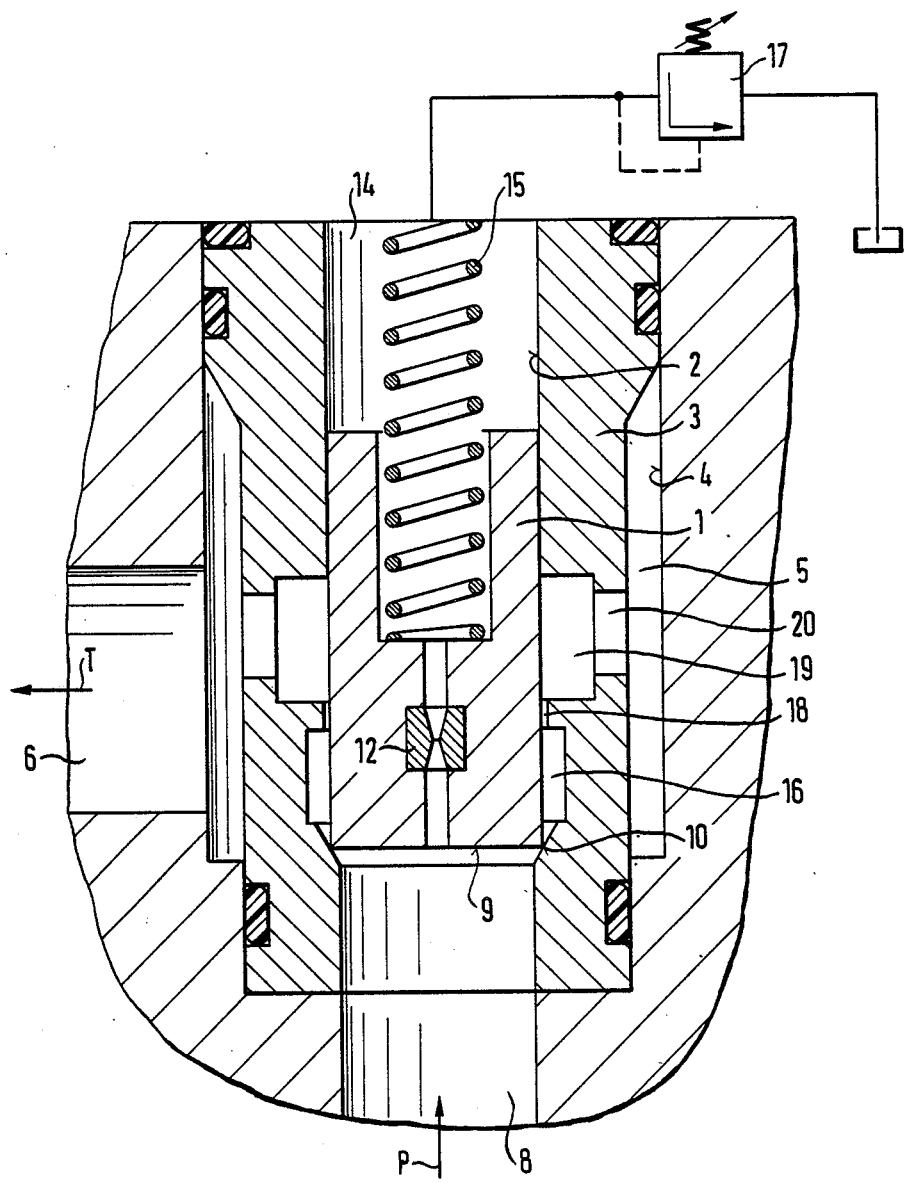

PRESSURE-LIMITING VALVE

The invention relates to a pressure-limiting or pressure-relief valve according to the preamble of claim 1.

In known pressure-relief or pressure-limiting valves, in which the piston is guided in a housing-side insert, on response of the valve the medium flows past the valve seat into an annular space of the insert and from there via bores in the insert to a tank connection (Rexroth EV 4212). The pressure drop between the system pressure and the low pressure arises at the piston seat. This pressure drop causes considerable noise.

Pressure-relief or pressure-limiting valves are known in which by series connection of flow resistances the noise is reduced. The system pressure is diminished via three pressure stages which lie in series, the first two stages being formed by piston collars cooperating with housing-side control edges and the last pressure stage being formed by a valve ball cooperating with a valve seat. The constructional expenditure involved in such a valve is great (dissertation O. Eich, 1979, page 144/145, FIG. 9.8 and 9.9).

Furthermore, for a pilot-controlled pressure-limiting valve a main piston is also known (mode S-BG 06, Yuken Kogyo, Japan) in which the discharging fluid is conducted via throttle cross-sections in the valve insert to the tank. The noise reduction is likewise by a plurality of series-connected resistances which require a corresponding constructional expenditure. Furthermore, in the known pressure-limiting valves in the pressureless circulation as well a relatively high pressure drop is present between the system pressure and the tank pressure.

The invention is therefore based on the problem of further developing a pressure-limiting valve in such a manner that it produces little noise and can be implemented with less constructional expenditure.

The solution of the aforementioned problem is effected according to the invention by the features set forth in the characterizing clause of claim 1.

Advantageous further developments result from the subsidiary claims.

According to the invention, downstream of the piston seat on the housing side or in the piston insert a throttle point is provided in particular in the form of an annular gap. The pressure reduction is thus effected in two pressure stages. This reduces the noise level. Of particular advantage is the simple construction. Furthermore, the construction according to the invention has a low resistance in pressureless circulation which is substantially equal to the resistance of known valves which are not noise optimized because the end face of the piston with corresponding stroke comes to lie downstream of the throttle point or annular gap and thus the flow resistance of the throttle point is cancelled. This advantage can be implemented with simple means.

An example of embodiment of the invention will be explained hereinafter with the aid of the single FIGURE of the drawing in which a section is shown through a pressure-limiting valve.

In the drawing a pilot-controlled pressure-limiting or pressure-relief valve is shown in which the main piston 1 is guided in a bore 2 of an insert 3. The insert 3 is sealingly inserted in a housing-side bore 4, giving an annular space 5 which is provided with a connection 6 leading to the tank T. The pressure P acts via the bore 8 on the end face 9 of the main piston 1.

The main piston 1 is pressed against the system pressure on to a spherical valve seat 10 in the insert 3. Via a throttle 12 the system pressure P also acts on the space 14 in which a spring 15 is arranged, as well as on the pilot valve 17 in known manner.

Downstream of the valve seat 10 in the insert 3 there is an annular groove 16 which is followed in the flow direction by an annular gap 18 which opens into a further annular gap 19 which via bores 20 communicates with the tank connection 6.

The valve responds when the system pressure reaches the value set at the pilot valve. Via the nozzle 12 and the pilot valve the fluid or flow medium flows to the tank. A pressure drop or pressure head results at the nozzle 12. If this pressure head exceeds the force of the spring 15 the main piston 1 opens. The fluid flows after leaving the piston seat 10 via the resistance formed by the annular gap 18 into the annular gap 19 and from there to the tank connection 6. This discharge system reduces the noise level.

If the main piston 1 opens in pressureless circulation of the fluid the end face 9 of the main piston 1 reaches the level of the annular space 19 so that the resistance formed by the annular gap 18 is eliminated and thus in pressureless circulation a very low flow resistance is present.

What is claimed:

1. A pressure-limiting valve comprising:
   a valve housing,
   a valve body within said valve housing, said body pressed by a valve force against fluid pressure onto a valve seat and movable from engagement with said valve seat to permit fluid flow across said valve seat when fluid pressure exceeds the valve force,
   a fluid passageway formed between said valve body and said valve housing downstream of said valve seat, said passageway comprising a first recess in said valve housing proximal said valve seat defining a first annular space between said valve body and housing, a second recess in said valve housing distal said valve seat defining a second annular space between said valve body and housing, and a throttle point between said first and second recesses, defining a third annular space between said valve body and housing wherein said second annular space has a volume greater than said first annular space, and said first annular space has a volume substantially greater than said third annular space.

2. Pressure-limiting valve according to claim 1, characterized in that the throttle point is arranged at a point within the range of the stoke of the valve body, and in the fully open position of the valve body the resistance of the throttle point is cancelled.

3. Pressure-limiting valve according to claim 1, characterized in that the valve body is a piston.

4. Pressure-limiting valve according to claim 1, characterized in that the pressure-limiting valve is pilot-controlled.

5. Pressure-limiting valve according to claim 2, characterized in that the valve body is a piston.

6. Pressure-limiting valve according to claim 4, characterized in that the valve body is a piston.

7. Pressure-limiting valve according to claim 6 further comprising an open axial bore through said piston having a constriction therein enabling fluid communication between said pilot downstream of said valve seat and a chamber under fluid pressure upstream of said valve seat.

* * * * *